United States Patent
Ramones et al.

(10) Patent No.: US 11,048,151 B2
(45) Date of Patent: Jun. 29, 2021

(54) MOUNT FOR ELECTRONIC DEVICE

(71) Applicant: Arlo Technologies, Inc., Carlsbad, CA (US)

(72) Inventors: John Ramones, San Ramon, CA (US); Henry Jupille, Montrose, CO (US); Christopher Fonzo, Carlsbad, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 79 days.

(21) Appl. No.: 16/600,988

(22) Filed: Oct. 14, 2019

(65) Prior Publication Data

US 2021/0109423 A1    Apr. 15, 2021

(51) Int. Cl.
| | |
|---|---|
| *G03B 17/00* | (2021.01) |
| *G03B 17/56* | (2021.01) |
| *F16C 11/06* | (2006.01) |
| *F16M 13/02* | (2006.01) |

(52) U.S. Cl.
CPC ........ *G03B 17/561* (2013.01); *F16C 11/0609* (2013.01); *F16M 13/022* (2013.01)

(58) Field of Classification Search
USPC ............. 396/427; 348/143; 248/181.1, 187.1
See application file for complete search history.

(56) References Cited

U.S. PATENT DOCUMENTS

| | | | |
|---|---|---|---|
| 5,649,256 A * | 7/1997 | Wen | ....................... F16M 11/14 396/427 |
| 10,038,829 B2 | 7/2018 | Gilbert | |
| 10,419,649 B2 | 9/2019 | Gilbert | |
| 2018/0109704 A1* | 4/2018 | Gilbert | ................. H04N 5/2252 |

* cited by examiner

*Primary Examiner* — Clayton E. LaBalle
*Assistant Examiner* — Warren K Fenwick
(74) *Attorney, Agent, or Firm* — Boyle Fredrickson S.C.

(57) ABSTRACT

An angularly adjustable mounting device is disclosed for use with a small electronic device such as a wireless camera. Also disclosed is a method of using the mounting device. The mounting device has an attachment device extending from a rotatable bearing. The bearing is angularly rotatable with a socket formed by an expandable bearing holder that may include spaced apart arms extending outwardly from a mounting plate. Rotation of an outer housing around the arms engages an inclined ramp thereby deflecting the arms inwardly and into frictional contact bearing to inhibit movement of the camera relative to a base. The outer housing is configured to rotate in an opposing direction to allow the electronic device to be repositioned.

20 Claims, 11 Drawing Sheets

MOUNT FOR ELECTRONIC DEVICE

BACKGROUND OF THE INVENTION

1. Field of the Invention

The invention relates generally to a mounting apparatus for an electronic device, and more particularly, relates to a mounting apparatus for supporting a directionally adjustable electronic device such as a wireless camera. The invention additionally relates to a method of using the same.

2. Discussion of the Related Art

As the market for small electronic devices has continued to expand, the availability and accessibility of cameras has similarly experienced growth. The wireless battery-powered camera industry has experienced significant expansion as a result of the improvement of digital photography, and the introduction of high-quality digital image sensors into a growing field of small electronic devices, such as webcams, wireless network compatible cameras, handheld camcorders, action cameras, etc. These various cameras have become increasingly commonplace, largely driven by their flexibility and general ease of use.

For example, wireless network compatible cameras often are used for a variety of purposes including home security, business security, child monitoring, pet monitoring, etc. Additionally, many of these cameras offer beneficial features such as night vision through the use of infrared LEDs, high definition widescreen video, digital zoom, motion detection, audio alerts, etc.

Despite the many various uses for these electric devices, such as wireless network compatible cameras, one common need is the ability to mount the device in a desired location. For example, remote monitoring systems that employ small cameras generally need to mount the camera to a support surface. In the context of an exterior security system, there is a need to mount one or more cameras around the perimeter of a building or property in order to permit monitoring of the building's or property's perimeter.

However, despite the need to mount a small camera in a desired location and position, there remains a need and desire to allow for adjustments to the mounting positions of the camera. For example, when a small camera is employed in the context of an exterior security system, it is often desirable to be able to adjust the camera's angular orientation side-to-side ("panning"), and/or up and down ("tilting") so that it is directed or "aimed" at a specific area of interest, such as a doorway. This directional adjustability can be particularly beneficial in the context of small cameras that are installed directly by the end user, and not a security system professional, and that may require various positional adjustments in order to obtain the desired camera field of view. Thus, there is need and desire to provide a camera mount that allows for ease of directional adjustability.

Typical adjustable mounts for small cameras include threaded fasteners that are secured with hand tools to hold the camera in place. These mounts similarly require the use of a hand tool, such as a screw driver, that can loosen the fasteners to adjust the camera's angular orientation and then retightened. Such mounting requires two hands to adjust the camera position: a first hand to hold the camera in the desired position, and a second hand operate the hand tool. Similarly, repositioning of the camera also requires the use of two hands.

In light of the foregoing, a camera mount that exhibits both secure camera position retention and an ease of camera angular position adjustability is desired.

Also, a method of using a camera mounting system that exhibits both secure camera position retention and an ease of camera angular position adjustability is also desired.

SUMMARY OF THE INVENTION

One or more of the above-identified needs is met by a directionally adjustable electronic device mounting device including a base having a mounting surface and a radially expandable bearing holder that defines a socket and that may include a plurality of circumferentially-spaced arms extending outwardly from the mounting surface. A ramp is disposed about an outer surface of the bearing holder. A rotatable bearing is at least partially received within the socket of the base. An attachment device for supporting an electronics device extends forwardly from and is affixed to the bearing, and a housing is disposed about the bearing holder. The housing includes a rotatably engaging ramp receiving slot along an interior surface of the housing, such that the housing is rotatably movable into contact with the ramp to bias the bearing holder into frictional engagement with the bearing at the socket and inhibit angular repositioning of the bearing and the attachment device (and thus the electronic device) relative to the base.

The housing may further comprise a first detent and a second detent disposed on opposed sides of the ramp receiving slot.

The bearing may have a substantially spherical outer surface that engages a first semi-spherical socket portion at an inner surface of the bearing holder.

The maximum diameter of an aperture formed by a front end of bearing holder.

The electronic device may be a wireless camera.

In accordance with another aspect of the invention, a method of mounting an electronic device such as a wireless camera is provided. The method includes affixing a base to a supporting surface, with a bearing being mounted in a socket disposed within a bearing holder extending from the base such that the bearing is angularly rotatable relative to the base. The method also includes rotating an outer housing over an outer surface of the bearing holder in a first direction, thereby engaging an inclined ramp disposed at the outer surface of the bearing holder an inner surface of the outer housing to bias the bearing holder into frictional engagement with the bearing and thereby inhibiting rotation of the bearing relative to the socket. The method further includes affixing an electronic device, such as a wireless camera, to an attachment device that is supported on and that moves with the bearing.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

A wide variety of electronic devices could be used with a mounting device in accordance with the invention as defined by the claims. Hence, while the preferred embodiments of the invention will now be described with reference to mounting a wireless battery-powered camera for use with a wireless monitoring network, it should be understood that the invention is in no way so limited.

Figure 1:
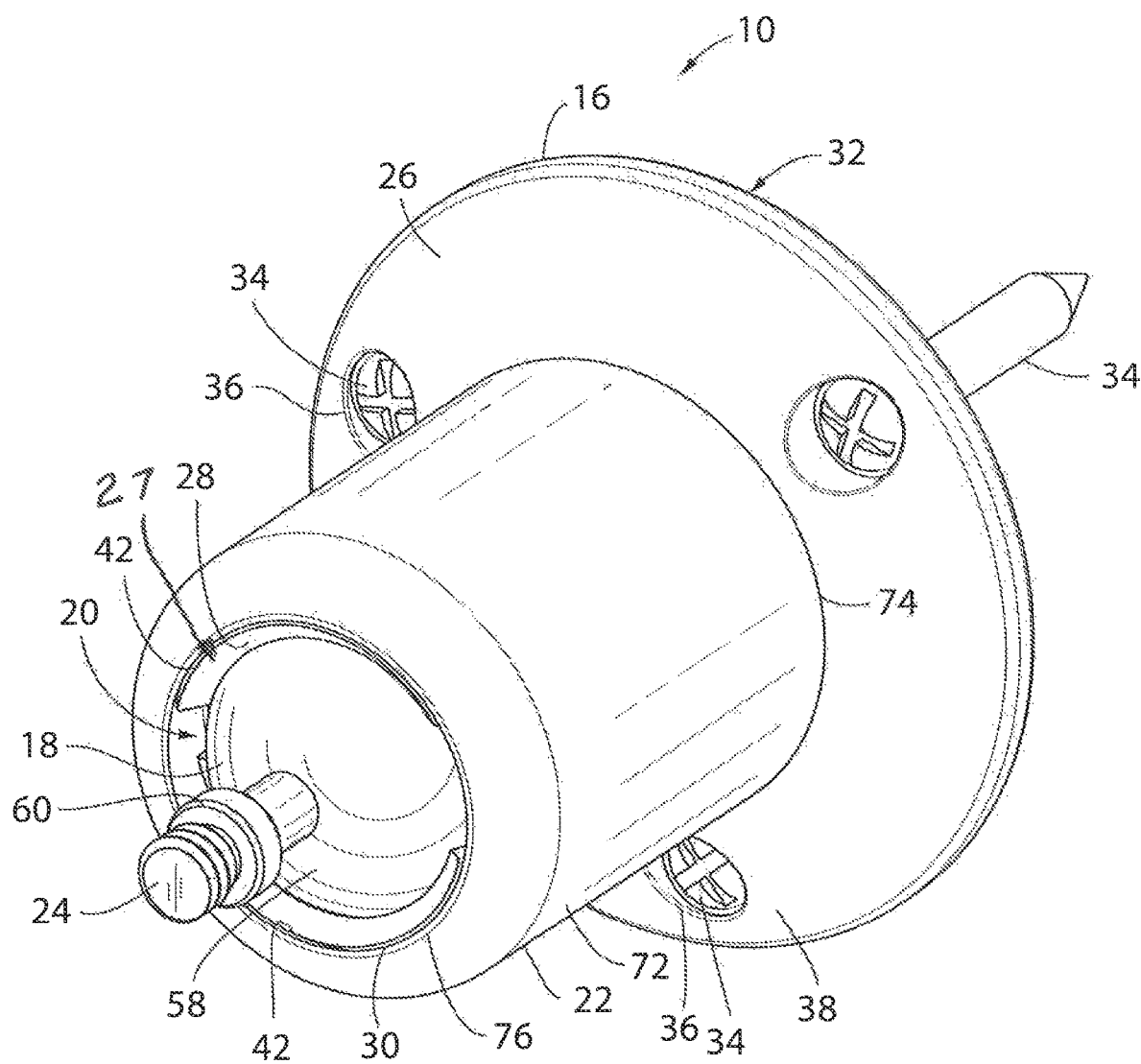
FIG. 1 is a front isometric view of an electronic device mount device constructed in accordance with an embodiment of the present invention.
Figure 10:
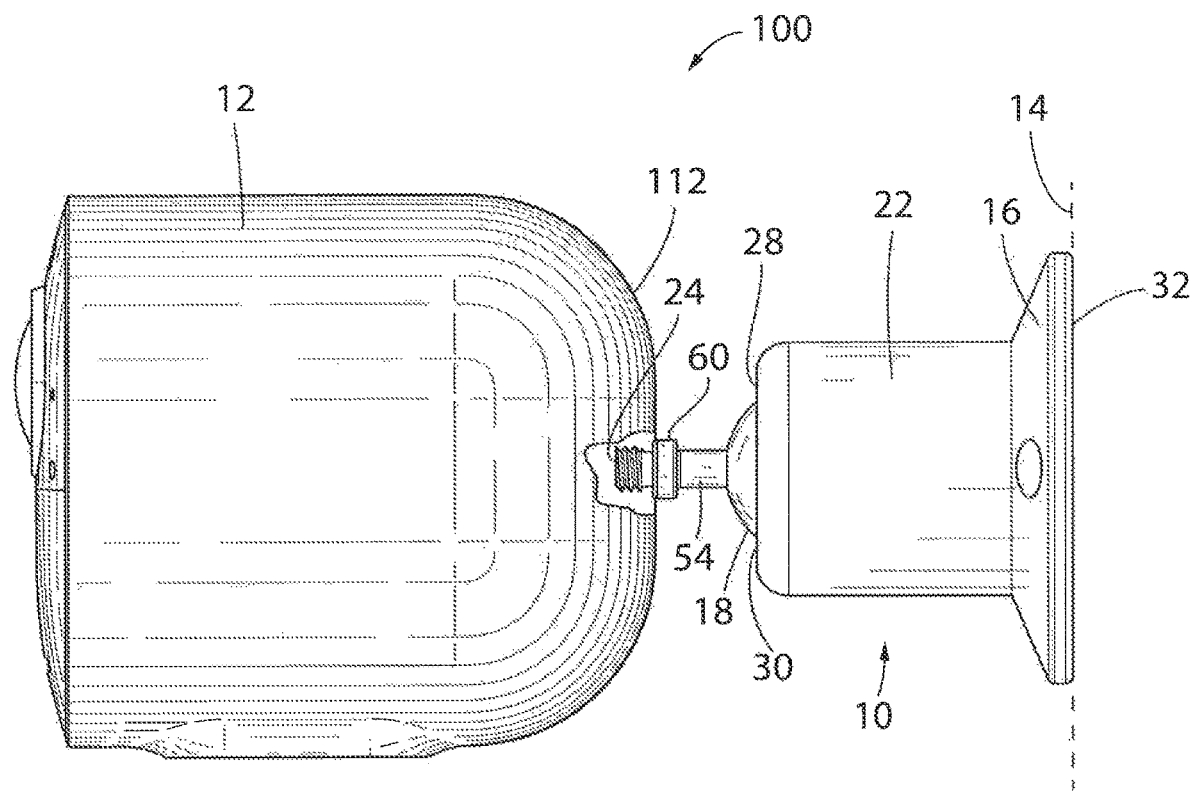
FIG. 10 is a side elevation view of a wireless camera and the mount device of FIG. 1, showing the camera in a first angular orientation thereof relative to the mounting device.
Figure 11:
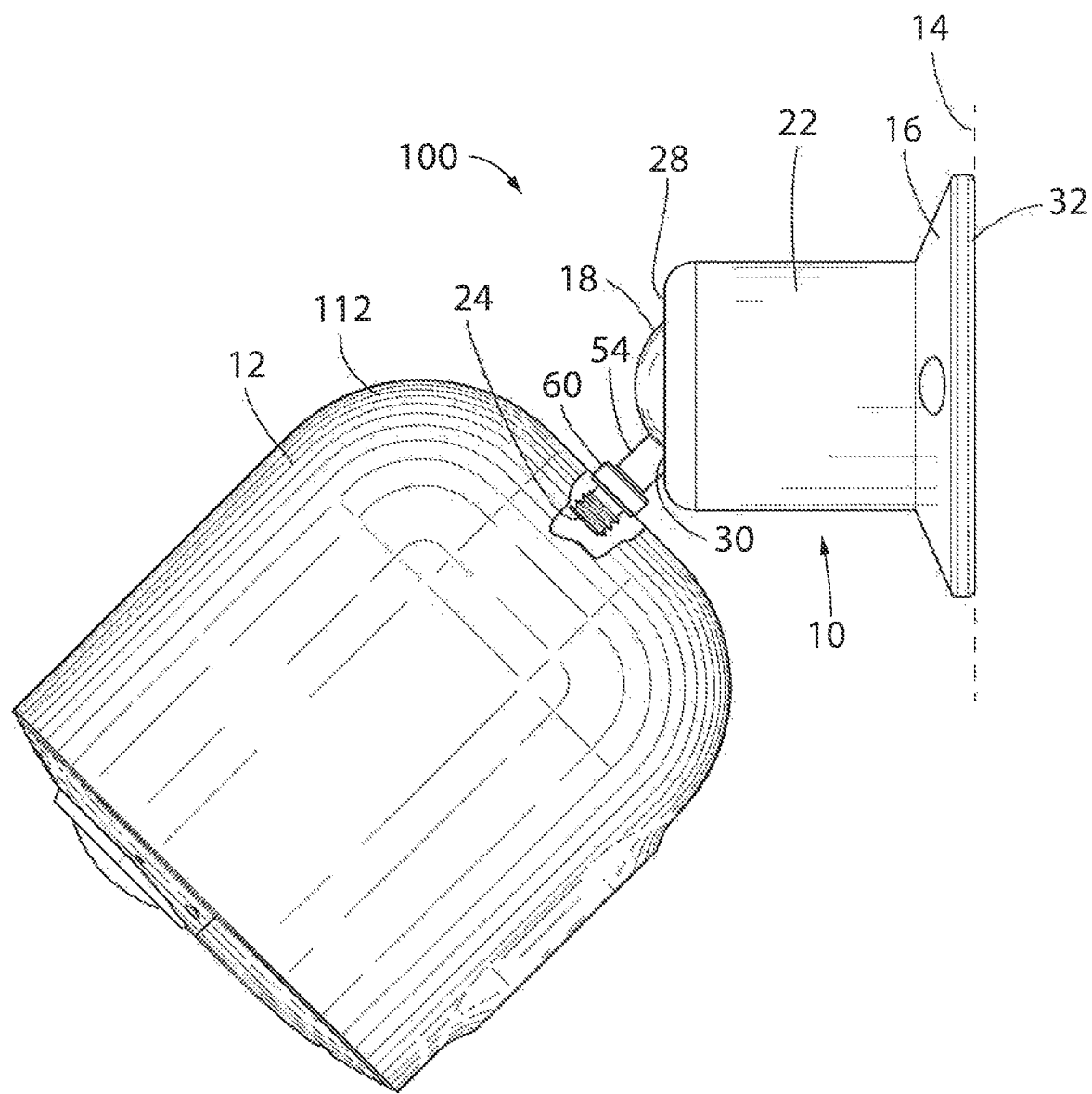
FIG. 11 is a side elevation view of the wireless camera and the mount device of FIG. 10, showing the camera in a second angular orientation thereof relative to the mounting device.

FIG. 1 is an isometric view of a directionally adjustable mounting device 10, i.e., mount, constructed in accordance with one embodiment of the present invention. Referring briefly to FIGS. 10 and 11, the mount 10 supports an electronics device, in this example a camera 12, in a manner that permits the camera 12 to be securely retained in a desired angular orientation relative to an underlying support surface 14 and to permit the camera 12 to be angularly repositioned (panned and/or tilted) to a different angular orientation and to be retained in the new position via a simple ration of the mount housing.

Figure 2:
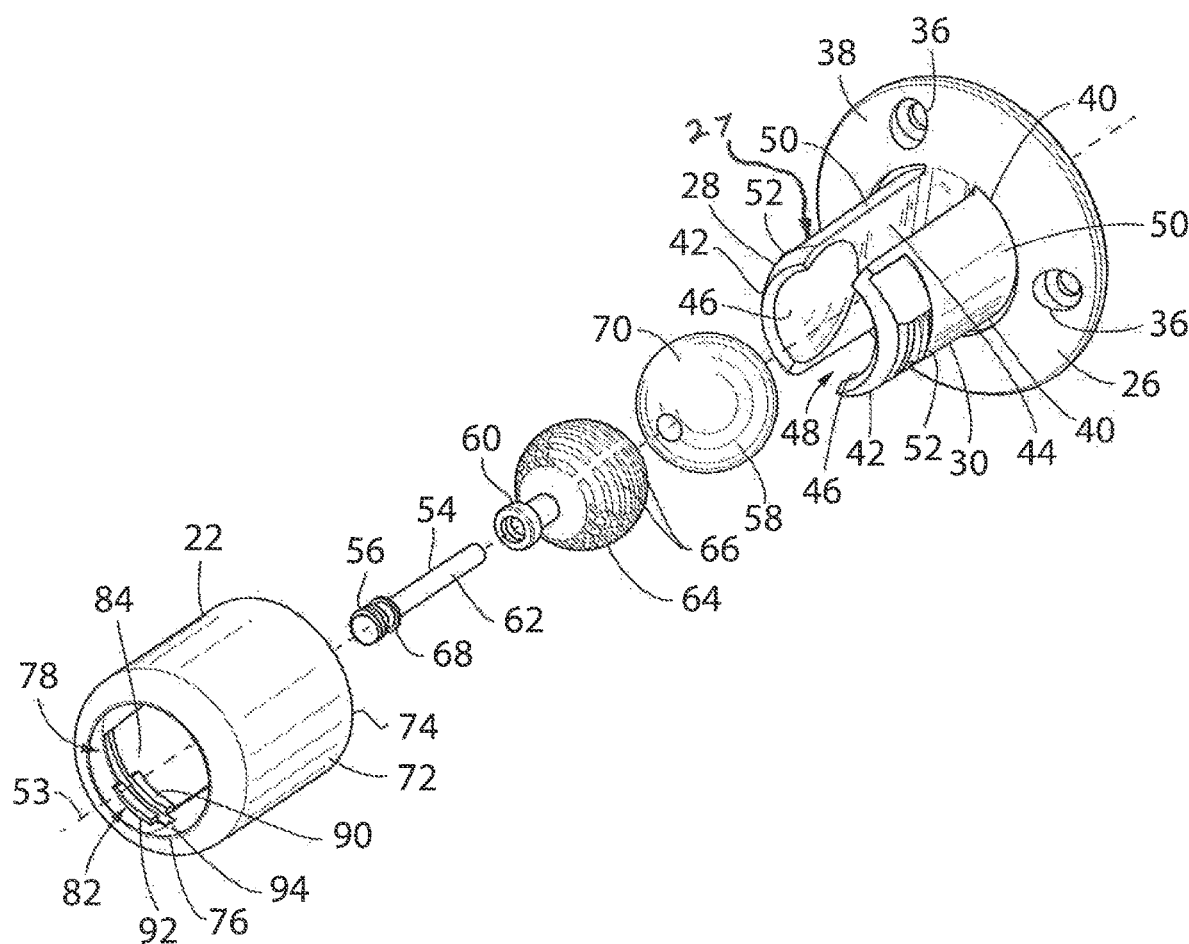
FIG. 2 is an exploded front isometric view of the mount device of FIG. 1.

Referring now to FIGS. 1 and 2, the mount 10, when assembled, includes a base 16, a bearing 18 located partially within the base 16 and protruding from an open front end or front aperture 20 of the base 16, and an outer housing 22 disposed about a portion of the base 16 that retains the bearing 18. An attachment device 24 extending forwardly from the bearing 18 is configured to receive an electronic device such as a camera 12.

The base 16 of the mount, which may be formed of a molded plastic, includes a rearwardly located mounting plate 26 and radially expandable bearing holder 27 that forms a socket 48 that receives the bearing 18 as discussed below. The bearing holder 27 may comprise an annular element having an outer end that is radially resiliently deflectable to expand the effective diameter of the socket. In the illustrated embodiment, the bearing holder 27 comprises a plurality of circumferentially-spaced arcuate forked arms 28, 30 extending forwardly of the mounting plate 26. While the embodiment of the mount 10 shown in FIG. 1 includes a base 16 having two The arms 28, 30 may be extend to the mounting plate as shown or to an annular support extending forwardly from the mounting plate. A rear surface 32 of the mounting plate 26 can be mounted on a support surface 14, for example a wall, ceiling, or fence post, with fasteners such as nails or screws 34 that pass through corresponding holes 36 in the mounting plate 26 and that are driven into the support surface 14 until the rear surface 32 of the mounting plate 26 is securely affixed to the support surface 14. Any exposed ends of the fasteners 34 may be flush set or recessed relative to the front surface 38 of the mounting plate 26 at that time. In one embodiment of the mount 10 as shown in FIG. 1, the mounting plate 26 of the base 16 may be generally circular and include three holes 36 for receiving screws 34; however, other shaped mounting plates 26 and numbers of hole 36 are well within the scope of the present invention.

As shown in FIGS. 2 and 6-9, the forked arms 28, 30 of the base 16 extend forwardly of the mounting plate 26 and are generally perpendicular to the plane in which the rear surface 32 of the mounting plate 26 lies. The arms 28, 30 each include a first end 40 affixed to the front surface 38 of the mounting plate 26 and an opposing second end 42 that collectively defines the open front end or front aperture 20 of the base 16. The tip of each second 42 may be tapered or rounded, as to provide for additional range of motion for the attachment device 24 extending forwardly from the bearing 18, as will be described below, and to facilitate ease of inserting the bearing 18 into the base 16. A portion of the inner wall 44 of each arm 28, 30 near the second end 42 includes a curvature the defines a socket portion 46 configured to correspond to the cur. Collectively, the socket portions 46 of each arm 28, 30 cooperate to form a socket 48 for receiving and retaining the bearing 18. When receiving the bearing 18 within the socket 48, the second ends 42 of the spaced-apart arms 28, 30 may resiliently deflect outwardly to accommodate passage of the bearing 18, and then rebound inwardly to retain the bearing 18 within the socket 48.

Still referring to FIG. 2, the curved outer wall 50 of each arm 28, 30 near the second end 42, i.e., at a location overlapping the position of the socket portions 46 of each arm 28, 30, includes an arcuate ramp 52. Each ramp 52 extends generally perpendicularly to the longitudinal axis 53 of the mount 10, such that the ramps 52 extend along a length of the curved outer wall 50 of each arm 28, 30 that defines the circumference of the spaced apart arms 28, 30 when viewed collectively in a frontal or coronal cross-sectional plane and shown in FIG. 7. As will be described in further detail below, in one embodiment the height of each ramp 52 increases when traveling along its length in a clockwise fashion. However, it should be understood that the height of each ramp 52 could alternatively increase in the opposite direction while remaining within the scope of the present invention.

Still referring to FIGS. 1 and 2, and as was briefly described above, the bearing 18 of the mount 10 is designed to frictionally engage the socket 48 under lateral forces exerted on the bearing 18 by the socket portion 46 of each opposing arm 28, 30. The lateral forces exerted by the socket portions 46 is of sufficient force to securely hold a mounted camera 12 in a set position relative to the body 16 when the outer housing 22 is rotatably engaging the outer surface 50 of the arms 28, 30 in a locking configuration as will be described below. Similarly, the bearing 18 is configured to be releasable from the socket 48, as to facilitate repositioning of the camera 12, when the outer housing 22 is rotatably disengaged from the outer surface 50 of the arms 28, 30, i.e., an unlocked configuration, such that the lateral force exerted on the bearing 18 by the socket portion 46 of each arm 28, 30 is reduced. To this end, the space-apart positioning of the arms 28, 30 provides them with sufficient clearance for movement as to allow for their inward deflection when in the locked configuration.

Figure 3:
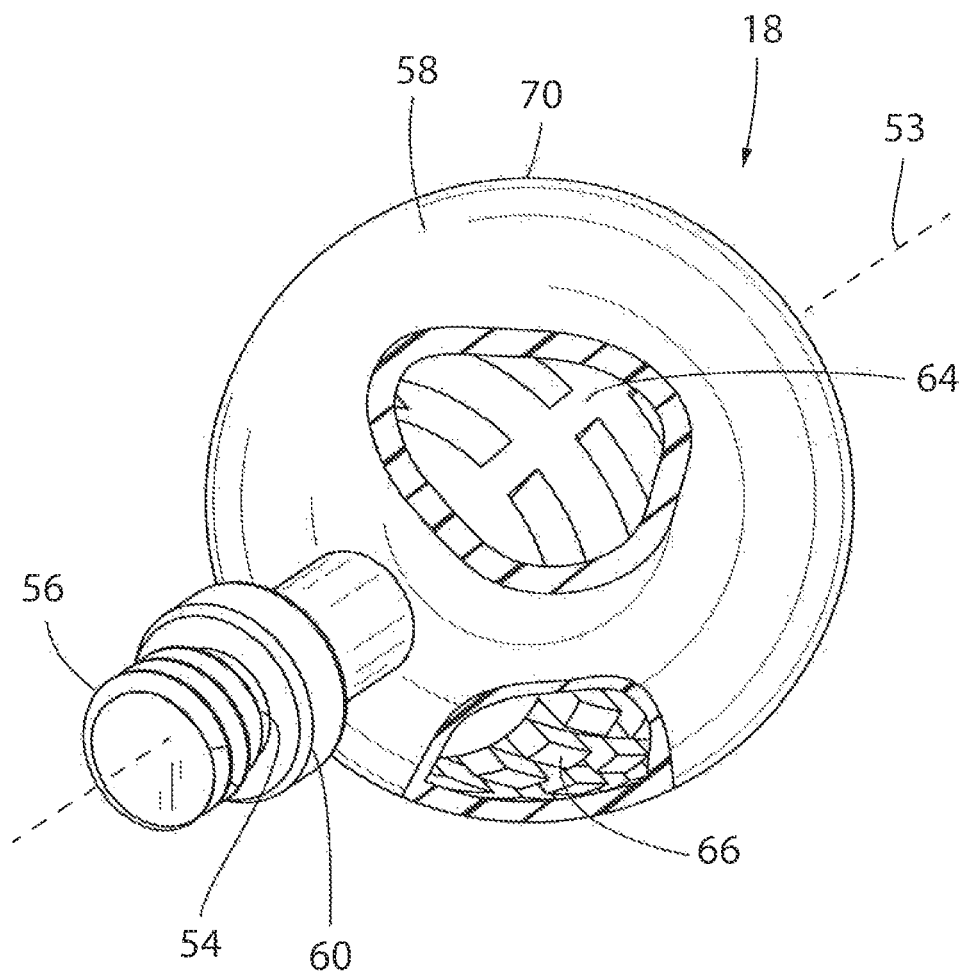
FIG. 3 is a partially cut-away front isometric view of a bearing of the mount device of FIG. 1, including cut away portions of the outer surface of the bearing.

Turning briefly to FIG. 3, the bearing 18 of this embodiment is a substantially spherical ball that is rotatable within the socket 48 of the body 16. The attachment device 24 of the bearing 18 may include a rod 54 that includes a threaded portion 56 extending forwardly from a front portion of the outer surface 58 of the bearing 18 that protrudes from the aperture 20. The threaded portion 56 of the rod 54 may allow a small electronic device, such as a camera 12, to be affixed to the mounting rod 54, as shown in FIGS. 10 and 11. In this configuration, a stop 60 located along the length of the rod 54 and rearwardly of the threaded portion 56 may engage the housing of the mounted camera 12 to from a weather tight seal as to limit exposure of the threaded portion 56 to atmosphere and/or prevent over tightening of the mount 10. The stop 60 may be planar or curved as to securely engage a complementary-shaped rear surface of the housing of an associated camera 12 or other small electronic device. For example, in one embodiment of the present invention not shown, the stop 60 defines a flange that is convex so as to mesh with a complimentary concave rear surface of the housing of the small electronic device, i.e., camera 12. However, the present invention is not so limited, and any alternative fixation devices are considered well within the scope of the present invention.

Still referring to FIGS. 2 and 3, the mounting rod 54 which may be formed, for example, from steel or an injection molded plastic, is shown as having a rear end portion 62 extending into a core 64 of the substantially spherical bearing 18 and extending along a central longitudinal axis 53 of the bearing 18. In one embodiment of the present invention, the rear end portion 62 of mounting rod 54 is insert-molded to the core 64. Core 64 may be formed of a polycarbonate molded plastic and may include a plurality of blades 66 extending outwardly from the central longitudinal axis 53 of the bearing 18. One or more knurls 68 positioned along the length of the mounting rod 54 may further affix the rod 54 to the core 64 of the bearing 18. An outer shell 70, formed of a rubberized material, such as thermoplastic urethane, having a relatively high coefficient of static friction, is then molded over the outer surface of the core 64 and mounting rod 54 to form the substantially spherical bearing 18 and its outer surface 58. When the bearing 18 is seated on the socket 48, as was described above, the curved surfaces of the socket portions 46 and the outer surface 58 of the bearing 18 may engage one-another with a coefficient of static friction of approximately 1.0 to 1.25, and more typically of approximately 1.16.

Returning now to FIGS. 1 and 2, and with the bearing 18 as described above located partially within the base 16 at the socket 48 and protruding from an open front end or front aperture 20 of the base 16, the outer housing 22 will now be described in further detail. The outer housing 22 includes a generally hallow cylindrical body 72 extending from a first end 74 to an opposing second end 76. As shown in FIG. 1, when the mount 10 is assembled, the outer housing is slid over the arms 28, 30 of the base 16, while it contains the bearing 18 in the socket 48. In this configuration, the first end 74 of the body 72 is located at the front surface 38 of the mounting plate 26, while the second end 76 defines a rounded edge circumferentially surrounding an open front end or front aperture 78 through which a second end 42 of the forked arms 28, 30 extend along with a protruding portion of the bearing 18, including the attachment device 24.

Figure 4:
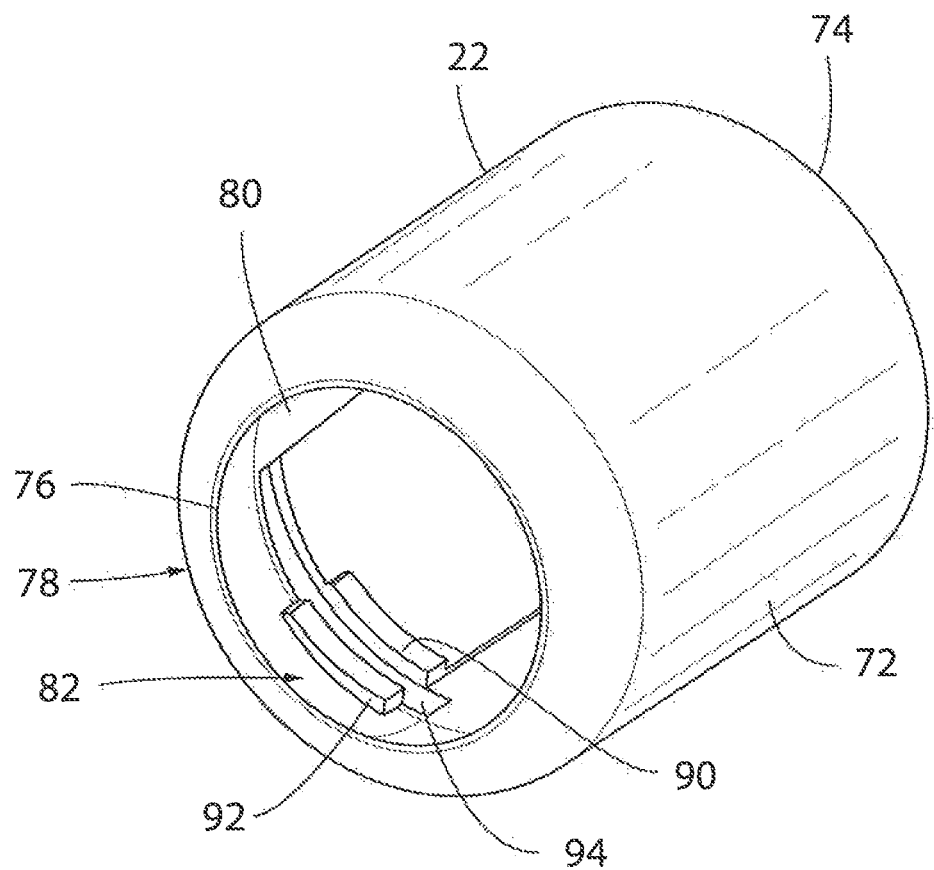
FIG. 4 is a front isometric view of an outer housing of the mount device of FIG. 1.
Figure 5:
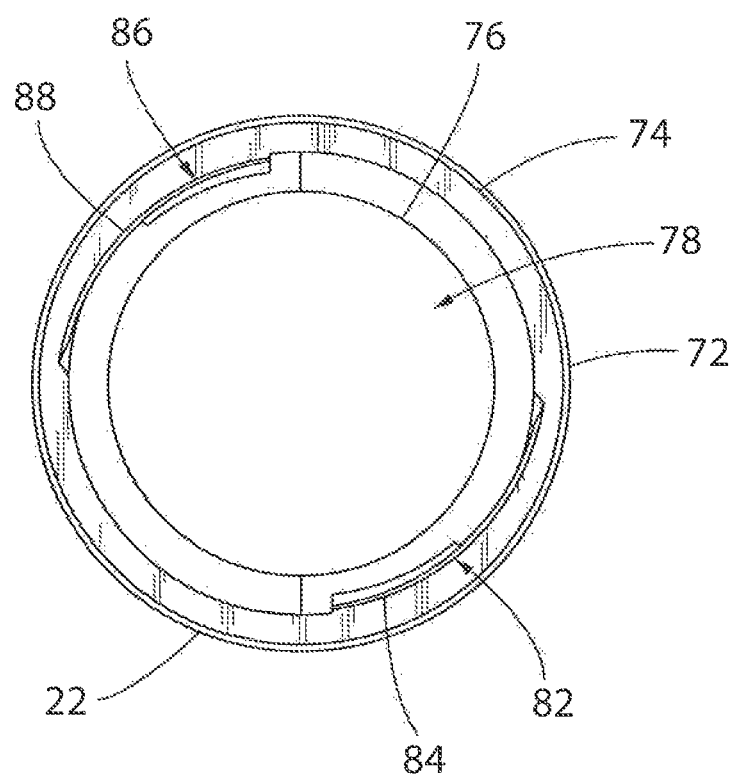
FIG. 5 is a rear perspective view of the outer housing of the mount device of FIG. 1.
Figure 6:
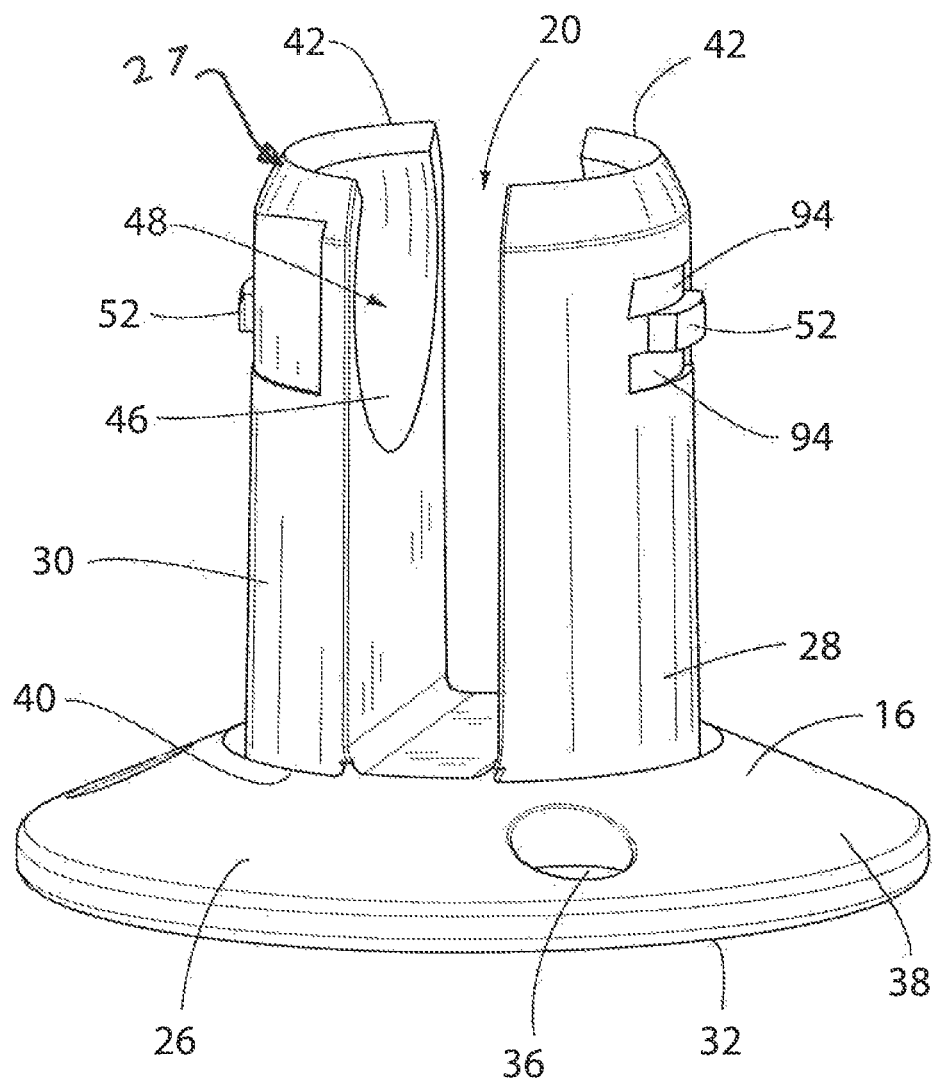
FIG. 6 is a side elevation view of a base of the mount device of FIG. 1.
Figure 7:
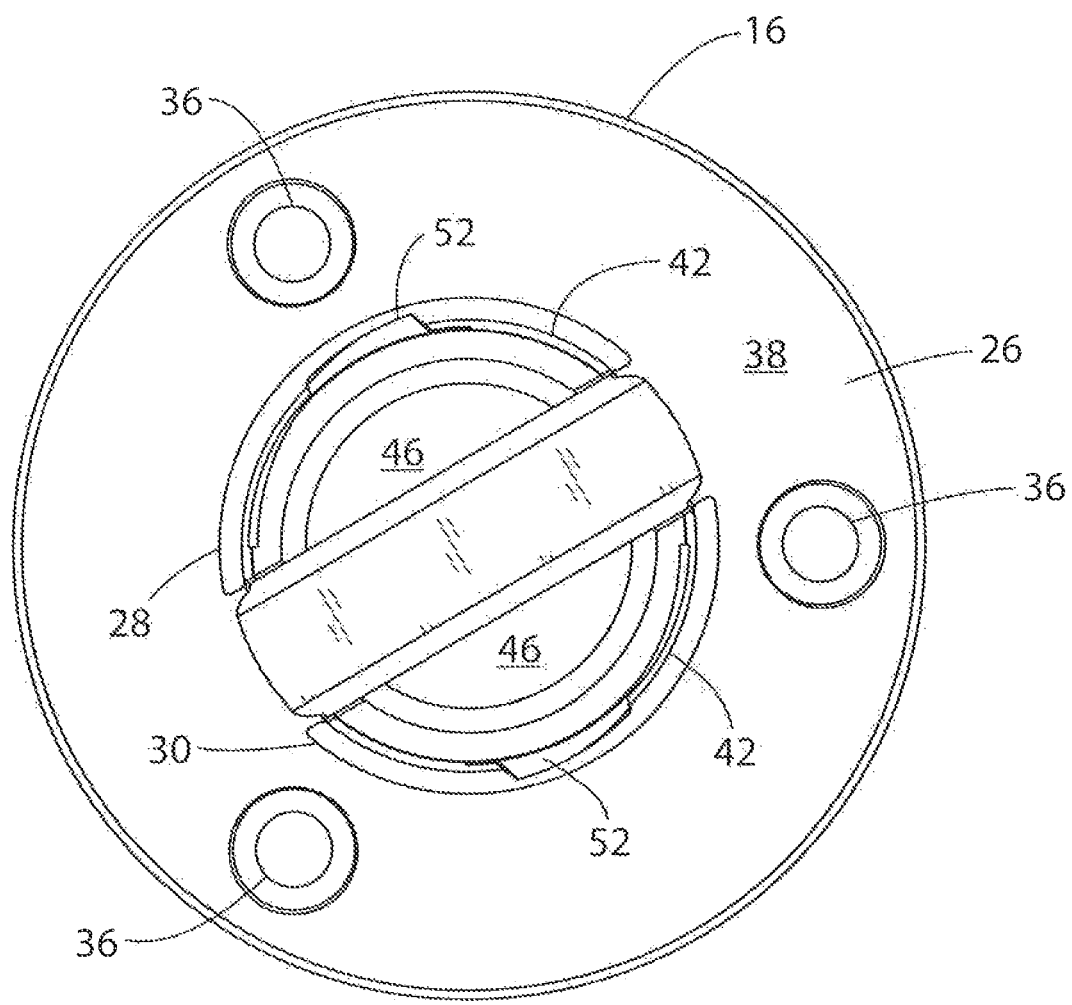
FIG. 7 is a front perspective view of the base of the mount device of FIG. 1.
Figure 8:
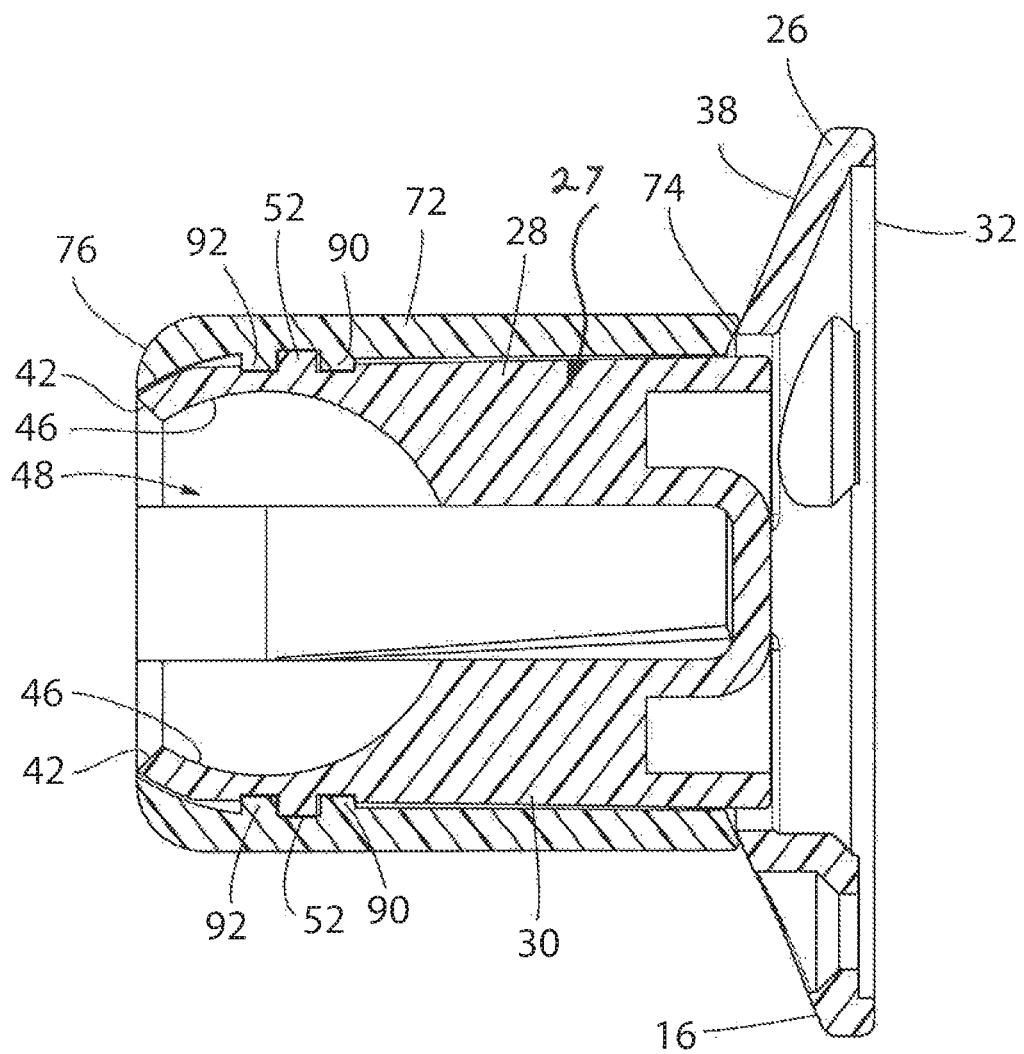
FIG. 8 is a side elevation cross-sectional view of the base and outer housing of the mount device of FIG. 1.

As is shown in FIG. 2, and more clearly in FIGS. 4 and 5, the inner wall 80 of the body 72 includes at least a first pair of detents 82 at a first portion 84 of the inner wall 80 and an opposing second pair of detents 86 at a second portion 88 of the inner wall 80. Each pair of detents 82, 86 comprises a first detent 90 and a second detent 92 defining a ramp receiving slot 94 between the detents 90, 92. Each of the ramp receiving slots 94 are configured to receive one of the ramps 52 located along the outer surface 50 of the arms 28, 30 therein. To appropriately rotationally index the outer housing 22 about the arms 28, 30 of the base 16, the first portion 84 and second portion 86 of the inner wall 80 of the body 72 may be of a reduced thickness relative to the remainder of the inner wall 80, and configured to accommodate the outwardly protruding ramps 52 such that the outer housing 22 can only be slid over the arms 28, 30 when the body 72 is rotated such that the ramps 52 are positioned at the first portion 84 and second portion 86 of the inner wall 80. Once properly oriented the outer housing 22 is slide down the length of the arms 28, 30 until the first end 74 of the body 72 reaches the front surface 36 of the mounting plate 26. In this position the second end 42 of the forked arms 28, 30 extend along with a protruding portion of the bearing 18, including the attachment device 24 through the front aperture 78 at the second end 76 of the body 72; however, the outer housing 22 does not place inwardly directed lateral force on the arms in this unlocked configuration. As such, the bearing 18 remains free to rotate within the socket 48 when the outer housing 22 is in this unlocked configuration. In order to lock the mounting device 10, once the desired angular position of the attachment device 24 has been selected, the body 72 of the outer housing 22 is rotated in a generally clockwise configuration. In the embodiment of the invention shown in FIG. 5, where the first and second pair of detents 82, 86 each define one-eighth of the circumferential distance of the inner wall 80, a one-eighth rotation of the outer housing is sufficient to place the mounting device into a locked configuration. However, it should be understood that the length of the pairs of detents 82, 86 and corresponding ramps 52 could be of various sizes thereby requiring a different degree of rotation to lock the mounting device 10.

In the locked configuration, the first and second detent 90, 92 of each pair of detents 82, 86 slides along opposing front and rear edges of the corresponding ramp 52, such that the ramp 52 is positioned within the ramp receiving slot 94. The first and second detents 90, 92 are similarly positioned within detent receiving slots 96 on either side of the ramp 52 on the outer surface 50 of the arms 28, 30. During the rotation of the outer housing 22, the progressively increasing height of the ramps 52 engage with the inner surface 80 of the body 72, at the first and second portions 84, 88. The increasing height of the ramps 52 caused the arms 28, 30 to correspondingly deflect inwardly, i.e., towards the bearing 18, thereby applying inwardly directed and opposing lateral forces onto bearing 18. When the rotation of the outer housing 22 has been completed, the lateral force exerted onto bearing 18 is of sufficient magnate as to inhibit movement of the bearing 18 relative to the base 16 thereby maintaining the attachment device 24 and any camera 12 affixed thereto in a locked position until the rotation of outer housing 22 is reversed to release the mounting device 10 into the unlocked configuration.

When the outer housing 22 is in the locked position, rotation of the bearing 18 is inhibited due to the frictional force between the curved surface of the socket portion 46 and the outer surface 58 of the bearing 18. In one embodiment of the present invention, the force required to rotate the stationary bearing 18 when it is seated in the socket 48 and the outer housing 22 is in the locked configuration, i.e., without first disengaging the outer housing 22 to release the inwardly deflected arms 28, 30, may have a magnitude of approximately 3.0 kgf to 10.0 kgf, and more typically approximately a magnitude of 6.0 kgf, when the force is applied to the second end 36 of the threaded portion 56 of the mounting rod 54.

Furthermore, in one embodiment of the present invention, as shown in FIG. 5, the first and second portions 84, 88 of the inner wall 80 of the body 72 may also increase in wall thickness, similar to the increasing thickness of each ramp 52. In this embodiment, the increasing wall thickness of the first and second portions 84, 88 may exert further inward deflection upon the ramps 52 and their corresponding arms 28, 30 during the locking rotation outer housing 22.

Figure 9:
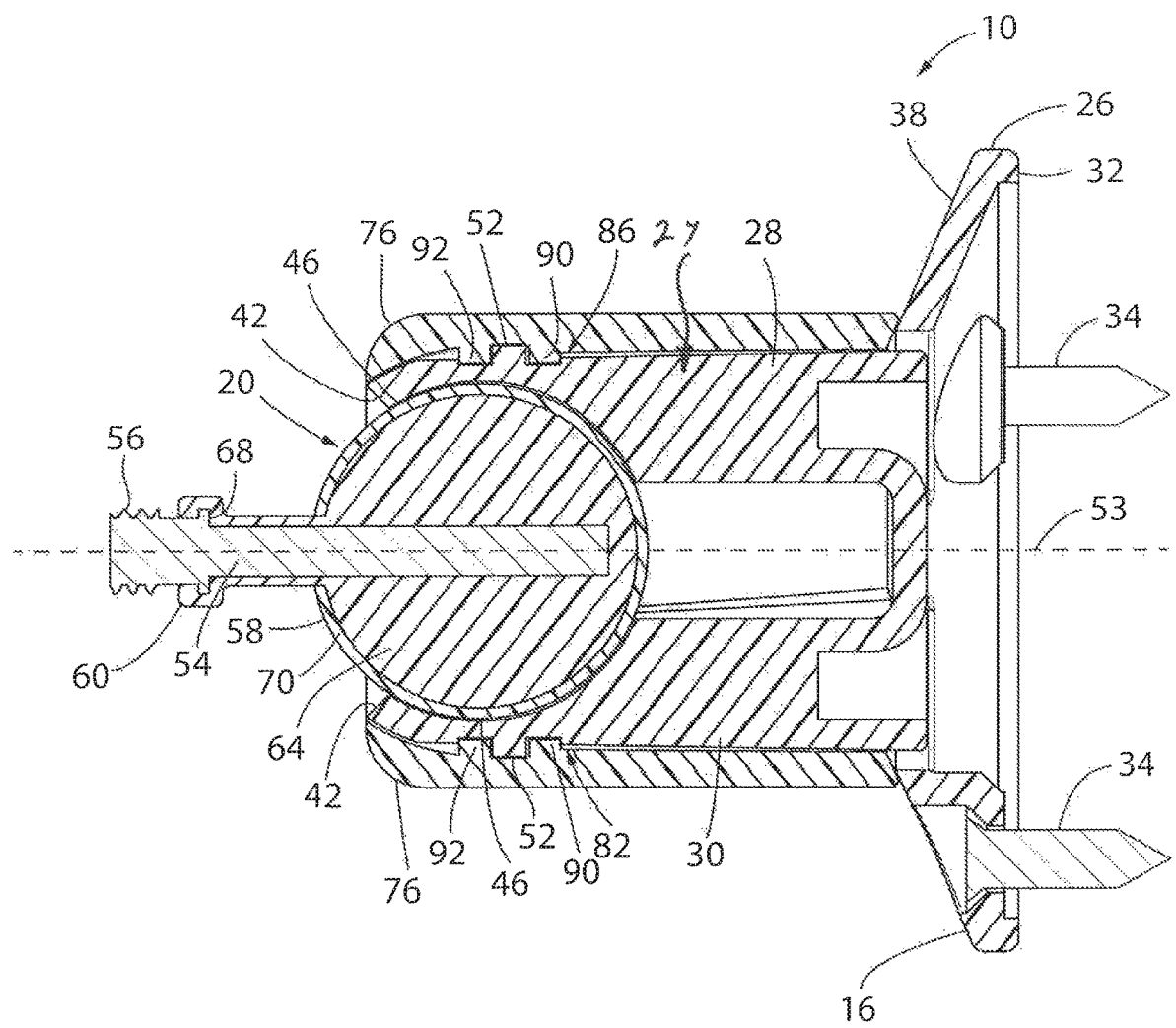
FIG. 9 is a side elevation cross-sectional view of the mount device of FIG. 1, showing the bearing within the socket of the base retained in a locked position by engagement of the outer housing and the base.

Turning now to FIG. 9, the mount 10 is shown in an assembled configuration. In one embodiment of the present invention, the outer surface 58 of the shell 70 of the bearing 18 and the curved surface of the socket portion 46 of the arms 28, 30 have at least substantially the same curvatures throughout an area of mutual contact. When assembled, with the outer housing 22 disposed about the arms 28, 30 of the base 16, the maximum diameter of the aperture 20 is considerably smaller than the maximum diameter of the bearing 18. The bearing 18 thus cannot be forced through the aperture 20 and "pop out" of the mount 10 when the outer housing 22 is disposed about the arms 28, 30 of the base 16. Similarly, due to the relatively smaller diameter of aperture 20, the mount 10 is to be assembled with the bearing 18 positioned within the socket 48 of the base 16 before the outer housing 22 is slid over the arms 28, 30, and, then the camera 12 is finally affixed to the attachment device 24.

Turning now to FIGS. 10 and 11, and initially FIG. 10, a mounted camera system 100 is shown in which a battery-powered wireless camera 12 is affixed to the attachment device 24, i.e., threaded portion of the protruding portion of the mounting rod 54. As shown in the partial cross-section views of FIGS. 10 and 11, the threaded portion of the mounting rod 54 is received within a corresponding threaded portion of a housing 112 of the camera 12, and the stop 60 has engaged a rear surface of the camera housing 112, such that the camera 12 is securely affixed to the mount 10 shown in FIG. 10. The longitudinal axis of the bearing and mounting rod 54 is shown to lie along the longitudinal axis 53 of the mount 10, such that the mounting rod 54 is generally centrally located within the overlapping apertures 20, 76 of the base 16 and outer housing 22. In this configuration, the camera 12 is securely retained in the illustrated angular orientation due to the lateral force exhibited on the outer surface 58 of the bearing 18 by the inwardly deflected socket portions 46 of the arms 28, 30.

In contrast, FIG. 11 shows the longitudinal axis of the mounting rod 54 to lie at an angle relative to the longitudinal axis 53 of the mount 10, such that the mounting rod 54 is not generally centrally located within the overlapping apertures 20, 76 of the base 16 and outer housing 22. As such, FIG. 10 may represent an alternative desired camera placement in which the inclination of the camera 12 is markedly different from that illustrated in FIG. 10.

In accordance with one embodiment of the present invention, the range of arcuate adjustment of the mounting rod 54 and thus of the camera 12 or other device mounted on it may be more than 30° and more preferably approximately 45° or more relative to the longitudinal axis 53 of the mount 10.

In order to move the camera 12 from the position illustrated in FIG. 10 to the position illustrated in FIG. 11, the user need only rotate the outer housing 22 in a counter-clockwise directed approximately one-eighth of a complete revolution, or approximately 45°, thus releasing the ramps 52 from the ramp receiving slots 94 and from engagement with the first portion 84 and second portion 86 of the inner wall 80. In one preferred embodiment of the present invention, the bearing 18 may be located at distance from a socket portion 46 of preferably approximately 0.25 mm to 3.0 mm, and more typically of approximately a distance of 1.0 mm when the mount 10 is in an unlocked configuration. Since the bearing 18 is now out of locking engagement with the socket 48, the bearing 18 and mounting rod 54 can be freely angularly rotated within the base 16 in order to adjust the angular orientation of the mounting rod 54 and any camera 12 or other device mounted on it relative to the base 16. The user then pivots the camera 12 to the desired new angular orientation of FIG. 11, with the corresponding rotation of the bearing 18 within the socket 48. With the camera 12 appropriately positioned, the user rotates the outer housing 22 in a clockwise directed approximately one-eighth of a complete revolution, or approximately 45°, thus seating the ramps 52 within the ramp receiving slots 94. Resultantly, the ramps 52 engage with the first portion 84 and second portion 86 of the inner wall 80 respectively to bias the arms 28, 30 inwardly and exhibit lateral retaining force on the outer surface 58 of the bearing 18.

It is contemplated that an alternative embodiment may incorporate any of the features of the previous embodiment described above.

Many other changes and modifications could be made to the invention without departing from the spirit thereof

We claim:

1. An adjustable mounting device for an electronic device, comprising:
   a base having an outer mounting surface;
   a bearing holder extending inwardly from the base and having a radially expandable inner end forming a socket;
   a ramp disposed about an outer peripheral surface of the bearing holder;
   a rotatable bearing at least partially received within the socket;
   an attachment device that extends forwardly from the bearing and that is affixed to the bearing, the attachment device being configured to support an electronic device; and
   a housing disposed about the bearing holder and having a rotatably engaging ramp receiving slot disposed at an interior surface of the housing, wherein the housing is rotatably movable into contact with the ramp to bias the bearing holder into frictional engagement with the bearing at the socket and to inhibit angular repositioning of the bearing and the attachment device relative to the base.

2. The adjustable mounting device of claim 1, wherein the bearing holder includes a plurality of circumferentially-spaced forked arms having inner ends that can deflect radially relative to one another, and wherein the ramp is disposed on an outer surface of at least one of the arms.

3. The adjustable mounting device of claim 2, wherein the plurality of arms comprises a first arm that is circumferentially-spaced apart from a second arm.

4. The adjustable mounting device of claim 3, wherein the ramp is a first ramp disposed about an outer surface of the first arm, and further comprising a second ramp disposed about an outer surface of the second arm.

5. The adjustable mounting device of claim 4, wherein the ramp receiving slot is a first ramp receiving slot that is configured to receive the first ramp, and further comprising a second ramp receiving slot that is configured to receive the second ramp.

6. The adjustable mounting device of claim 3, wherein the bearing has a substantially spherical outer surface that engages a first socket portion at an inner surface of the first arm and a second socket portion at an inner surface of the second arm.

7. The adjustable mounting device of claim 6, wherein the first and second socket portions are semi-spherical.

8. The adjustable mounting device of claim 7, wherein the bearing and the first and second socket portions have at least substantially the same curvatures throughout an area of mutual contact.

9. The adjustable mounting device of claim 8, wherein an end of the first arm and an end of the second arm define an aperture through which the attachment device extends, and wherein a maximum diameter of the aperture is less than a maximum diameter of the bearing when the housing is disposed about the plurality of arms.

10. The adjustable mounting device of claim 1, further comprising a camera affixed to the attachment device, and wherein biasing the bearing holder into frictional engagement with the bearing at the socket generates a frictional force between the substantially spherical outer surface of the bearing and the socket portion of sufficient magnitude to inhibit movement of the camera.

11. The adjustable mounting device, of claim 1, wherein the housing further comprises a first detent and a second detent disposed on opposed sides of the ramp receiving slot.

12. The adjustable mounting device of claim 1, further comprising an area of decreased wall thickness adjacent the ramp receiving slot.

13. The adjustable mounting device of claim 12, wherein the area of decreased wall thickness indexes the rotational position of the housing relative to the base.

14. The adjustable mounting device of claim 1, wherein the ramp receiving slot defines a portion of the housing having a progressively increasing wall thickness.

15. An adjustable mounted camera system, comprising:
a camera having a camera housing with a threaded opening formed therein;
an attachment device having a threaded first end received within the threaded opening of the camera housing;
a substantially spherical bearing affixed to attachment device;
a base having a mounting surface, a first arm and a second arm that is spaced circumferentially from the first arm, the arms extending outwardly from the mounting surface about a longitudinal axis and defining a socket configured to receive the bearing between respective inner surfaces of the spaced-apart arms;
a first inclined ramp disposed about an outer surface of first arm and a second incline ramp disposed about an outer surface of second arm, wherein the inclined ramps extend perpendicularly from the longitudinal axis; and,
a housing disposed about the arms having a first and second ramp receiving slots disposed at an interior surface of the housing configured to rotatably receive the first and second inclined ramps respectively, wherein the housing is rotatably movable into contact with the ramps to bias the arms radially into frictional engagement with the bearing at the socket and inhibit angular repositioning of the attachment device and camera relative to the base.

16. The adjustable mounted camera system of claim 15, wherein the housing further comprises an area of decreased wall thickness adjacent each ramp receiving slot configured to rotationally index the housing about the base.

17. The adjustable mounted camera system of claim 15, wherein the ramp receiving slots each define a portion of the housing having a progressively increasing wall thickness.

18. The adjustable mounted camera system of claim 15, wherein the outer surfaces of first arm and the outer surface of second arm lie within a common circle.

19. A method of mounting a wireless camera on a support, comprising the steps of:
affixing a base to a supporting surface, a bearing being mounted in a socket formed by a radially-expandable bearing holder extending from the base, wherein the bearing is angularly rotatable relative to the base;
rotating an outer housing over an outer surface of the bearing holder in a first direction, thereby engaging an inclined ramp disposed at the outer surface of the bearing holder with an inner surface of the outer housing and biasing the bearing holder radially into frictional engagement with the bearing, thereby inhibiting rotation of the bearing relative to the socket; and,
affixing a wireless camera to an attachment device that is supported on and that moves with the bearing.

20. The method of claim 19, further comprising the steps of:
rotating the outer housing over the outer surface of the bearing holder in a second direction that is opposite the first direction, thereby disengaging the inclined ramp from the inner surface of the outer housing and releasing the bearing holder from frictional engagement with the bearing to allow rotation of the bearing relative to the socket;
while the bearing is released from the socket, altering an angular orientation of the camera and the bearing relative to the socket; then
rotating the outer housing over the outer surface of the bearing holder in a first direction, thereby reengaging the inclined ramp with the inner surface of the outer housing and biasing the bearing holder radially into frictional engagement with the bearing to inhibiting rotation of the bearing relative to the socket.

* * * * *